United States Patent [19]

Maruyama et al.

[11] Patent Number: 4,533,557

[45] Date of Patent: Aug. 6, 1985

[54] FEED ADDITIVES FOR RUMINANTS

[75] Inventors: Hiromi Maruyama; Seiji Sasaoka; Mitsuo Kiuchi; Hironori Kanehara, all of Chiba, Japan

[73] Assignee: Nippon Soda Co. Ltd., Tokyo, Japan

[21] Appl. No.: 481,853

[22] Filed: Apr. 4, 1983

[30] Foreign Application Priority Data

Apr. 2, 1982 [JP] Japan .................................. 57-54978
Oct. 7, 1982 [JP] Japan ............................... 57-176803

[51] Int. Cl.$^3$ .............................................. A23K 1/00
[52] U.S. Cl. ...................................... 426/61; 426/63; 426/72; 426/601; 426/656; 426/807
[58] Field of Search ................... 426/72, 74, 623, 641, 426/643, 807

[56] References Cited

U.S. PATENT DOCUMENTS 4,145,446 3/1979 Kurucz et al. .................. 426/807 X
4,248,899 2/1981 Lyon et al. ...................... 426/807 X

FOREIGN PATENT DOCUMENTS 56-1057 of 1981 Japan.

OTHER PUBLICATIONS

Hawley, "The Condensed Chemical Dictionary", 10th Edition, Van Nostrand Reinhold Co., N.Y., 1982, p. 228.

Oke et al., "The Possible Use of Chitin and Chitosan as Animal Feed", Proc. Int. Conf. Chitin/Chitosan Inst., 1977, pp. 327-333.

Maruyama et al., Feed & Feed Additives for Ruminants, Chem. Abstracts, vol. 100, Abstract No. 5059u.

*Primary Examiner*—R. B. Penland
*Attorney, Agent, or Firm*—George B. Oujevolk

[57] ABSTRACT

Feed additives for ruminants comprises tablets or granules of a mixture of biologically active ingredient(s), chitosan and protective material(s) which are one or more substance(s) selected from the group consisting of saturated or unsaturated aliphatic mono-carboxylic acids having 14 to 22 carbon atoms, hardened vegetable oils and hardened animal oils.

By containing chitosan, said feed additives easily pass through the rumen and are easily digested by digestive organs from abomasum, consequently said biologically active ingredient(s) are efficiently absorbed by oral feeding to ruminants.

1 Claim, No Drawings

FEED ADDITIVES FOR RUMINANTS

BACKGROUND OF THE INVENTION

The present invention relates to feed additives for ruminants, and more particularly, concerns rumen bypass feed additives comprising tablets or granules, in which biologically active ingredients are protected by protective materials which are not decomposed by the digestive juice in the rumen and to be efficiently absorbed through digestive organs from abomasum.

BRIEF REVIEW OF THE PRIOR ART

Hitherto, it is known that biologically active ingredients, for example, amino acid such as methionin is decomposed by microbes present in the digestive juice of the rumen, consequently, its activation has been lost. Therefore, various designed feed additives for ruminants such as biologically active ingredients protected from the microbes present in the digestive juice of the rumen and absorbed through digestive organs from abomasus have been examined.

For examples, granulated feed additives comprising biologically active ingredients surrounded by protecting materials such as triglycerides, rice bran waxe, etc., are described in the Japanese Patent Publication No. Tokko-sho 48-12785.

Feed additives comprising biologically active ingredients coarted or surrounded by straight or branched, substituted or unsubstituted saturated aliphatic mono-carboxylic acids having at least 14 carbon atoms or their salts or a mixture of said saturated aliphatic mono-carboxylic acids or their salts are described in the Japanese Patent Publication No. Tokko-sho 56-1057.

It is expected that these feed additives are broken down and absorbed through digestive organs after the abomasum such as the duodenum, the colon, however, as a practical matter these are excreted as they are being protected by protective materials, because these feed additives have a slight retention time through the digestive organs.

As improved feed additives free of these defects of not being absorbed, being excreted, feed additives having a protecting material of a mixture with aliphatic mono-carboxylic acids having 14 to 22 carbon atoms or ricinolic acid or hardened vegetable or animal oils sodium, potassium or calcium salts of aliphatic mono-carboxylic acids having 14 to 22 carbon atoms or ricinolic acid are shown in Japanese Patent Open No. Tokkai-sho 56-154956. It is expected that these feed additives are broken down by using a difference in PH value with the digestive juice in the rumen and abomasum so as to be free of the working of enzymes. However, the digestion of said feed additives and the absorption of biologically active ingredients in these feed additives is insufficient, because the breaking down of the protective materials composing said feed additives is very show.

OBJECTS OF THE INVENTION

Accodingly, it is an object of the present invention to provide feed additives for ruminants that deadly by-pass through the rumen, and are rapidly broken down through the abomasum.

The present inventors have conducted research to accomplish the aforesaid object and found that feed additives comprising tablets or granules of a mixture of biologically active ingredient(s), chitosan and protective materials easily pass through the rumen and rapidly break down in the abomasum, and consequently, have accomplished the present invention.

DETAILED DESCRIPTION

Generally speaking, the present invention contemplates feed additives for ruminants comprising tablets or granules of a mixture of biologically active ingredient(s), chitosan and protective materials.

In the present invention, biologically active ingredient(s) are ingredient(s) having biological activities by oral feeding to ruminants, but easily losing said activities by microbes and digestive juice in the rumen. For example, amino acids such as methionin, lysine etc., amino acid derivatives such as N-acyl amino acids, N-hydroxymethylmethionin calcium, lysine hydrochloride etc., hydroxy homologues of amino acids such as 2-hydroxy-4-methylmercaptobutyric acid, its calcium salt etc., proteins such as powder of feather, fish meal, casein, potato's protain etc., vitamins such as vitamin A, vitamin A acetate, vitamin A palmitate, vitamin $D_3$, vitamin E, nicotinic acid, nicotinic acid amide, calcium pantothenate, $\beta$-carotin etc., enzymes such as acidic protease etc., carbohydrate such as grape sugar etc., veterinary medicines such as antibiotics, insecticides etc. are listed up. As N-acyl amino acids N-stearoyl-methionine, N-oleoylmethionine etc. are listed up. Penicillin, tetracycline etc. are listed up as antibiotics.

In the present invention, protective materials are one or more substance selected from the group consisting of straight or branched, substituted or unsubstituted, saturated or unsaturated aliphatic mono-carboxylic acids having 14 to 22 carbon atoms, hardened vegetable oils and hardened animal oils.

Chitosan being another component of feed additives for ruminants is a fiberous polysaccharide which is obtained by hydrolyzing chitin using alkali, and works as a protective material for biologically active ingredients in the rumen and a breaking down agent of feed additives comprising tablets or granules in the abomasum.

In carrying the invention into practice, inorganic substance(s) are added to the mixture of biologically active ingredient(s), chitosan and protective materials to control the gravity of feed additives comprising tablets or granules.

As inorganic substance(s), permitted food additives such as kaolin, calcium carbonate etc. can be used, favourably, one or more inorganic substance(s) selected from the group consisting of calcium phosphates, calcium sulfate, magnesium oxide, magnecium sulfate, and aluminium hydroxide are used, because these work by breaking down co-agent(s) of feed additives comprising tablets or granules in the abomasum.

In the invention, the quantity of biologically active ingredient(s) in feed additives is not more than 60 weight percent of the total weight, and differs by the kind of biologically active ingredients. Generally in the case of nutrients such as amino acids, amino acid derivatives, protein etc., the quantity is selected in a range of 25 to 60 weight percent of the total weight, and in case of vitamins, enzymes and veterinary medicines, the quantity is not more than a few percent of total weight.

In case the quantity of biologically active ingredient(s) is more than 60 weight percent of the total weight, a large quantity of biologically active ingredient(s) are distributed on the surface of the feed additives comprising tablets or granules, and dissolve out to the digestive juice in the rumen, consequently, the utility of biologically active ingredients falls.

The quantity of chitosan in feed additives is selected in a range of 1 to 25 parts by weight, favourably, 3 to 10 weight precent of protective materials used in feed additives. It is undesirable to use excess chitosan, because dissolving out of biologically active ingredient(s) into the digestive juice of the rumen increase, further, it is undesirable to use wanting chitosan, because breaking down of feed additives in the abomasum is insufficient.

The quantity of inorganic substance(s) is a quantity keeping the gravitiy of feed additives in a range of 0.8 to 2.0, favourably 1.0 to 1.4 g/cm$^3$. The gravity of feed additives is important to avoid the long retention time of feed additives in the rumen by floating on or sinking under the digestive juice of the rumen and to pass through the rumen rapidly. Generally, the quantity of inorganic substance(s) is selected in a range of 20 to 30 weight percent of protective materials using feed additions.

The feed additives contemplated herein are made into tablets or granules by tableting or granulating the melted slurry of the mixture of biologically active ingredient(s), chitosan, protecting materials, inorganic substance(s) and other additive(s) using a general method such as droping tableting or granulating method, extruding tableting or granulating method etc.

The particle size of tablets or granules of feed additive is generally selected in a range of 200 micron to 5 millimeter.

For examples, granules of feed additives having less than 1 millimeter of particle size are obtained by using a roatating disk granulater, and tablets of feed additives having 1 to 5 millimeter of particle size are obtained by dropping the melted slurry on a cooled plate from nozzle(s) or pin(s) of the dropper.

It is desirable to use biologically active ingredient(s) having a particle size of 110 favourably 170 tyler mesh pass, and chitosan having a particle size of 65 tyler mesh pass for producing dense tablets or granules of feed additives having an excellent by-passing efficiency through the rumen and an excellent breaking down efficiency in the abomasum.

By using chitosan, feed additives comprising tablets or granules of the invention have an excellent by-passing efficiency through the rumen, especially, an excellent breaking down efficiency in the abomasum as compared with known feed additives, because chitosan is insoluble to neutral or alkaline solution(s) such as the digestive juice in the rumen and easily soluble to acidic solution(s) such as the digestive juice in the abomasum, consequently, biologically active ingredient(s) in feed additives are absorbed through digestive organs from the abomasum and effectively utilized by ruminants.

The present invention are more minutely described in the following examples; however, these examples are not to be construed to limit the scope of the invention.

Unless otherwise stated, quantities are expressed as parts by weight.

EXAMPLE 1

Feed additives for ruminants comprising tablets or granules having various compositions were produced by dropping a slurry of a uniform mixture of biologically active ingredient(s), chitosan, protective material(s) and inorganic substance(s) at a temperature range of 60° to 90° C. on a cooled stainless steel plate at a temperature of 5° C. from the dropper having 1.6~2.5 mm diameter X 10~25 mm length pin or into the cooled air at a temperature of 5° C. from the roatating disk.

1 gr of each of the feed additives obtained were dipped in 200 ml of the Mcdougall's artificial saliva corresponding to the digestive juice of the rumen at a temperature of 39° C. during 24 hours under a a vibrating instrument. Mcdougall's artificial salivia is prepared by dissolving 9.8 g of NaHCO$_3$, 0.57 g of KCl, 0.04 g of CaCl$_2$, 9.3 g of Na$_2$HPO$_4$.12H$_2$O, 0.47 g of NaCl and 0.12 g of MgSO$_4$.7H$_2$O into 1 l of water (PH=8.3).

Then, each of the samples were dipped in 200 ml of the Cleak-Lubs's buffer solution with a pH of 2 corresponding to the digestive juice in the abomasum at a temperature of 39° C., during 3 hours using a vibrating instrument, in which the Cleck-Lubs's buffer solution is prepared by mixing 50 ml of 0.2N KCl solution, 10.6 ml of 0.2N HCl solution and 139.4 ml of water.

The dissolving rates of biologically active ingredient(s) in each samples into the McDougall's artificial salivia and the Cleak-Lubs's buffer solution is obtained by analysis of biologically active ingredient(s) in each solutions.

The composition of the feed additives obtained and disolving rates of biologically active ingredient(s) into the Mcdougall's artificial salivia and the Cleak-Lubs's buffer solution are shown in Table 1 with compared Examples.

In Table 1;
A. Used biologically active ingredients that were on the market and more over 90 weight % of had a particle size of 110 Tyler mesh pass.
B. Used chitosan had a particle size of 65 Tyler mesh pass.
C. Analysis of amino acids was made by the iodine titration method.
D. Analysis of DL-2-hydroxy-4-methyl tiobutiric acid calcium and feather powder was made by the column chromatography.
E. Analysis of glucose was made by the colorimetric method.
F. Analysis of nicotinic acid amide was made by the kjeldahl's method.
G. Analysis of sulfa-dimethoxine sodium was made by the sodium nitrite titration method.

TABLE 1

| No. | Examples | | | | | | | |
|---|---|---|---|---|---|---|---|---|
| | 1-1 | 1-2 | 1-3 | 1-4 | 1-5 | 1-6 | 1-7 | 1-8 |
| Bio. act. ingredient | | | | | | | | |
| B-1 methionin | 30 | 30 | 35 | 35 | 40 | 35 | 35 | 35 |
| B-2 lysine hydrochloride | | | | | | | | |
| B-3 nicotinic acid amide | | | | | | | | |
| B-4 DL-2-hydroxy-4-methyl tiobutyric acid calcium | | | | | | | | |
| B-5 feather powder | | | | | | | | |
| B-6 acid protease | | | | | | | | |
| B-7 glucose | | | | | | | | |

TABLE 1-continued

| | | | | | | | | |
|---|---|---|---|---|---|---|---|---|
| B-8 sulfa-dimethoxine sodium | | | | | | | | |
| C. Chitosan | | | | | | 5 | 5 | 5 |
| Protecting material | | | | | | | | |
| P-1 tallow hardened oil-E.H. | | 12 | | | | | | |
| P-2 tallow hardened oil-54° | 56 | 36 | 50 | | | 50 | 50 | 50 |
| P-3 soya bean hardened oil | | | | | 43 | | | |
| P-4 stearic acid | | | | 52 | | | | |
| P-5 sodium stearate | | | | | | | | |
| Inorg. substance | | | | | | | | |
| I-1 $CaCO_3$ | 3 | 20 | | | 3 | | | |
| I-2 $Ca(H_2PO_4)_2 \cdot H_2O$ | 7 | | 5 | 5 | 10 | | 5 | 5 |
| I-3 $CaHPO_4$ | | | | | | 5 | | |
| I-4 $CaSO_4$ | | | | | | | | 8 |
| I-5 $MgCO_3$ | | | | | | | 5 | |
| I-6 $Al(OH)_3$ | | | 5 | 5 | | 5 | | |
| Particle Size (mm) | | | | | | | | |
| T. Tablets | 2.8~4.0 | | 2.8~4.0 | | 2.8~4.0 | | 2.8~4.0 | 2.3~4.0 |
| G. granules | | 0.8~1.4 | | 0.8~1.4 | | 0.8~1.4 | | |
| Dissolving rate (%) | | | | | | | | |
| M.D. McDougall's s. | 14.7 | 9.0 | 15.3 | 23.6 | 10.0 | 17.8 | 12.7 | 11.1 |
| C.L. Cleak-Lubs's S. | 64.6 | 51.3 | 62.3 | 50.0 | 45.0 | 60.5 | 59.3 | 61.9 |

| | Examples | | | | | | | |
|---|---|---|---|---|---|---|---|---|
| No. | 1-9 | 1-10 | 1-11 | 1-12 | 1-13 | 1-14 | 1-15 | 1-16 | 1-17 |
| Bio. act. ingredient | | | | | | | | | |
| B-1 methionin | 35 | | | | | | | | |
| B-2 lysine hydrochloride | | 30 | | | | | | | |
| B-3 nicotinic acid amide | | | 30 | 30 | | | | | |
| B-4 DL-2-hydroxy-4-methyl tiobutyric acid calcium | | | | | 35 | | | | |
| B-5 feather powder | | | | | | 40 | | | |
| B-6 acid protease | | | | | | | 30 | | |
| B-7 glucose | | | | | | | | 40 | |
| B-8 sulfa-dimethoxine sodium | | | | | | | | | 25 |
| C. Chitosan | 3 | 3 | 3 | 5 | 4 | 4 | 4 | 2 | 3 |
| Protecting material | | | | | | | | | |
| P-1 tallow hardened oil-E.H. | | | | | | | | 4 | 12 |
| P-2 tallow hardened oil-54° | | | | 55 | 51 | 46 | 56 | 44 | 50 |
| P-3 soya bean hardened oil | | | | | | | | | |
| P-4 stearic acid | 52 | 57 | 57 | | | | | | |
| P-5 sodium stearate | | | | | | | | | |
| Inorg. substance | | | | | | | | | |
| I-1 $CaCO_3$ | | 10 | 10 | | 3 | 5 | 5 | 5 | 5 |
| I-2 $Ca(H_2PO_4)_2 \cdot H_2O$ | | | | 5 | 7 | 5 | 5 | 5 | 5 |
| I-3 $CaHPO_4$ | | | | | | | | | |
| I-4 $CaSO_4$ | | | | | | | | | |
| I-5 $MgCO_3$ | 10 | | | | | | | | |
| I-6 $Al(OH)_3$ | | | | 5 | | | | | |
| Particle Size (mm) | | | | | | | | | |
| T. Tablets | | 2.8~4.0 | 2.8~4.0 | 2.8~4.0 | 2.3~4.0 | 2.8~4.0 | 2.8~4.0 | | |
| G. granules | 0.8~1.4 | | | | | | | | |
| Dissolving rate (%) | | | | | | | | | |
| M.D. McDougall's s. | 20.1 | 21.3 | 21.9 | 18.2 | 12.0 | 7.0 | — | 17.0 | 11.0 |
| C.L. Cleak-Lubs's S. | 54.8 | 52.3 | 50.9 | 57.5 | 39.0 | 48.0 | — | 53.0 | 50.3 |

| | Comparison Examples | | | | | | |
|---|---|---|---|---|---|---|---|
| No. | 1-1 | 1-2 | 1-3 | 1-4 | 1-5 | 1-6 | 1-7 |
| Bio. act. ingredient | | | | | | | |
| B-1 methionin | 30 | 30 | 35 | 35 | | | |
| B-2 lysine hydrochloride | | | | | 43 | | |
| B-3 nicotinic acid amide | | | | | | 30 | 30 |
| B-4 DL-2-hydroxy-4-methyl tiobutyric acid calcium | | | | | | | |
| B-5 feather powder | | | | | | | |
| B-6 acid protease | | | | | | | |
| B-7 glucose | | | | | | | |
| B-8 sulfa-dimethoxine sodium | | | | | | | |
| C. Chitosan | — | — | — | — | — | — | — |
| Protecting material | | | | | | | |
| P-1 tallow hardened oil-E.H. | | 60 | | | | | |
| P-2 tallow hardened oil-54° | | | 55 | | | | 60 |
| P-3 soya bean hardened oil | | | | | | | |
| P-4 stearic acid | 60 | | | 50 | 43 | 60 | |
| P-5 sodium stearate | | | | 15 | | | |
| Inorg. substance | | | | | | | |
| I-1 $CaCO_3$ | 10 | 10 | 10 | — | 14 | 10 | 10 |
| I-2 $Ca(H_2PO_4)_2 \cdot H_2O$ | | | | | | | |
| I-3 $CaHPO_4$ | | | | | | | |
| I-4 $CaSO_4$ | | | | | | | |

TABLE 1-continued

| | | | | | | | |
|---|---|---|---|---|---|---|---|
| I-5 MgCO3 | | | | | | | |
| I-6 Al(OH)3 | | | | | | | |
| Particle Size (mm) | | | | | | | |
| T. Tablets | 2.8~4.0 | 2.8~4.0 | 2.8~4.0 | 2.8~4.0 | 2.8~4.0 | 2.8~4.0 | 2.8~4.0 |
| G. granules | | | | | | | |
| Dissolving rate (%) | | | | | | | |
| M.D. McDougall's s. | 15.4 | 3.5 | 4.8 | 16.3 | 21.8 | 22.3 | 5.6 |
| C.L. Cleak-Lubs's S. | 3.4 | 4.5 | 3.2 | 29.5 | 8.6 | 9.5 | 8.1 |

EXAMPLE 2

Tablets of feed additives having a range of 2.8~4.0 mm of a particle size were produced by using methionin having various particle size as a biologically active ingredient.

The dissolution rate of methionin in the feed additives produced and placed into the McDougall's artificial salivia and the Cleak-Lubs's buffer solution were obtained by the same method of Example 1.

The composition of produced feed additives was shown as below:
methionin: 30
chitosan: 4
tallow hardened oil-54°: 56
$CaCO_3$: 3
$Ca(H_2PO_4)_2 \cdot H_2O$: 7

Results of Example 2 is shown in Table 2.

TABLE 2

| No. | 2-1 | 2-2 | 2-3 | 2-4 |
|---|---|---|---|---|
| Particle size of methionin (Tyler mesh) | 60~170 | 80~115 | 115~170 | 170~400 |
| Dissolving rate (%) | | | | |
| McDougall's s. | 25.0 | 22.0 | 17.0 | 14.0 |
| Cleak Lubs's s. | 32.0 | 41.0 | 50.0 | 54.0 |

EXAMPLE 3

Tablets of feed additives containing methionin as a biologically active ingredient were produced by using chitosan of various particle size.

Dissolving rates of metionin in the feed additives produced and placed into the McDougall's artificial salivia and the Cleak-Lubs's buffer solution were obtained by the same method of Example 1.

The composition of produced feed additives was shown as bellow:
methionin: 30
chitosan: 4
tallow hardened oil-54°: 56
$CaCO_3$: 3
$Ca(H_2PO_4)_2 \cdot H_2O$: 7

Results of Example 3 is shown in Table 3.

TABLE 3

| No. | 3-1 | 3-2 | 3-3 | 3-4 |
|---|---|---|---|---|
| Particle size of Chitosan (Tyler mesh) | 6~16 | 65 pass | 150 pass | 270 pass |
| Dissolving rate (%) | | | | |
| McDougall's s. | 35 | 14 | 12 | 9 |
| Cleak-Lubs's s. | 30 | 54 | 54 | 56 |

TEST EXAMPLE 1

Feed additives produced by Example 1-3 and comparison Example 1-2 were fed by the double turn method to 8 cows (Holstein) partitioned in 4 groups consisting of 2 cows, 100~150 days after a childbirth.

Feeding method by the double turn method are shown as Table 4. Fed quantities of feed additives per one cow was 50 g/day.

TABLE 4

| Group | First 20 days | Second 20 days | Third 20 days |
|---|---|---|---|
| A | nominal feed | nominal feed + Example 1-3 | nominal feed |
| B | nominal feed + Example 1-3 | nominal feed | nominal feed + Example 1-3 |
| C | nominal feed | nominal feed + C. Example 1-2 | nominal feed |
| D | nominal feed + C. Example 1-2 | nominal feed | nominal feed + C. Example 1-2 |

TABLE 5

| Group | First 20 days | Second 20 days | Third 20 days | First + Third −2 × Second |
|---|---|---|---|---|
| A | 23.95 | 24.85 | 24.20 | −1.55 |
| B | 26.55 | 25.50 | 26.40 | +1.95 |
| C | 23.90 | 23.45 | 23.55 | +0.35 |
| D | 25.30 | 25.30 | 25.35 | +0.05 |

TEST EXAMPLE 2

Feed additives produced by Example 1—1 were fed to 5 calfs (Holstein, mail) having 130 kg of average weight of body, in which feed additives consisting 1-5 weight % of normal feed were mixed in normal feed.

Average increased weight of body per day during 28 days is shown in Table 6 with compared 5 calfs being not fed feed additives.

TABLE 6

| | Test Group | Compared Group |
|---|---|---|
| Average taking quantity of feed (Kg/day) | 4.91 | 5.26 |
| Average increased weight of body (kg/day) | 1.29 | 1.14 |
| Efficiency of feed kg (feed)/kg (increased weight) | 3.80 | 4.61 |

What is claimed is:

1. A granular feed additive for ruminants consisting of edible material of at least one biologically active ingredient, a protective material and chitosan, wherein, the biologically active ingredient is a material selected from the group consisting of amino acids, amino acid derivatives, hydroxy homologues of amino acids, proteins, vitamins, enzymes, and mixtures thereof; the protective material is a material selected from the group consisting of straight or branched saturated or unsaturated aliphatic mono-carboxylic acids having from 14 to 22 carbon atoms; wherein the quantity of chitosan is in the range of 1 to 25 parts by weight of the protective material, the quantity of the biologically active ingredient is not more than 60 parts by weight of the total weight; the particle size of the biologically active ingredient is about 110 Tyler mesh pass to about 170 Tyler mesh pass, the particle size of the chitosan is about 65 Tyler mesh pass, said feed additive being soluble in a buffer solution having a pH of about 2 consisting of about 50 parts of 0.2N KCl and about 10 parts of 0.2N HCl mixed in about 140 parts of water, said buffer solution corresponding to the digestive juice in the abomasum of said ruminant.

* * * * *